Aug. 30, 1966     F. M. MILLER     3,268,997
METHOD OF MAKING A POROUS SEALING DEVICE
Filed May 14, 1963
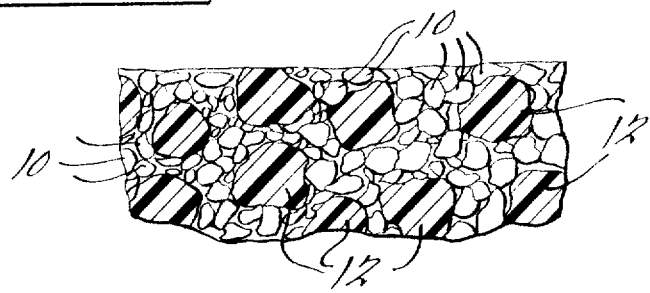
FIG. 1.
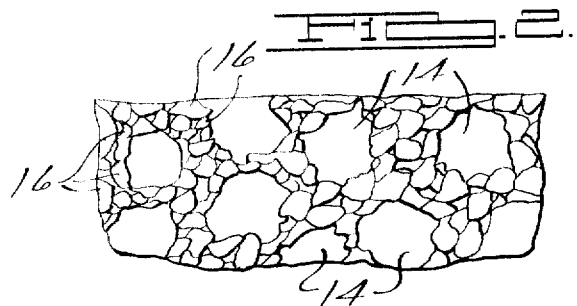
FIG. 2.
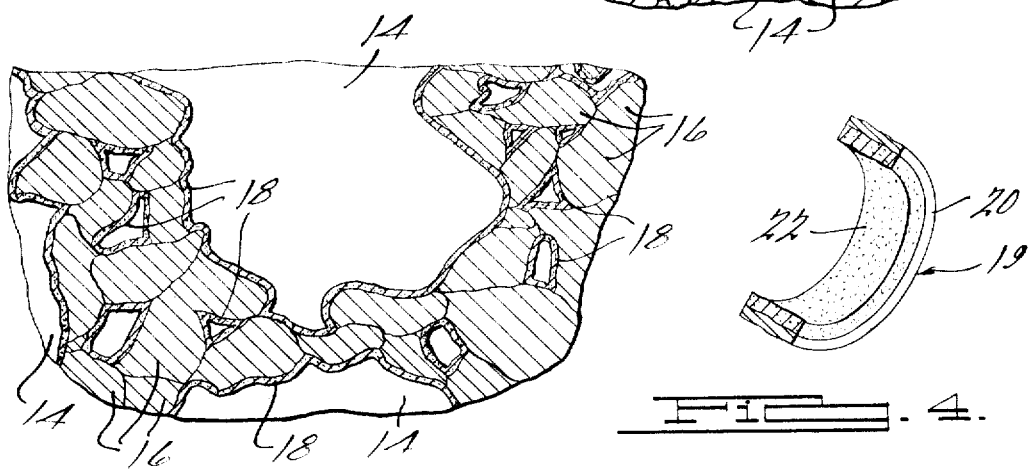
FIG. 3.
FIG. 4.
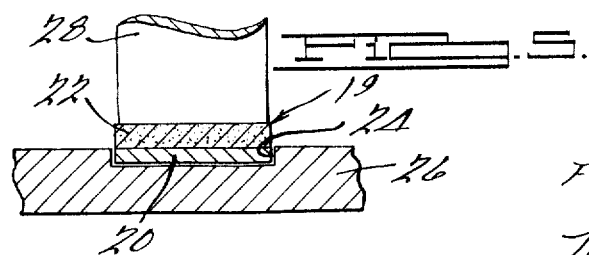
FIG. 5.
INVENTOR.
Forbes M. Miller
BY
Carness, Dickey & Pierce
ATTORNEYS United States Patent Office 3,268,997
Patented August 30, 1966

3,268,997
METHOD OF MAKING A POROUS
SEALING DEVICE
Forbes M. Miller, Detroit, Mich., assignor to Wall Colmonoy Corporation, Detroit, Mich., a corporation of Delaware
Filed May 14, 1963, Ser. No. 280,360
6 Claims. (Cl. 29—420)

The present invention broadly relates to a novel sealing device, and more particularly to an improved seal comprising a compressible sintered porous matrix of a controlled porosity and composition which is adapted to be disposed in close clearance relationship between relatively moving parts and is deformable without seizure in response to decreases in the clearance relationship between the parts maintaining thereby a highly efficient seal over prolonged periods of use. A further feature of the present invention is directed to a novel method employing powder metallurgical techniques for forming a porous sintered metallic sponge or matrix which is tenaciously bonded to a high strength backing member forming therewith a composite seal.

A variety of mechanical apparatuses are in use wherein it is desirable to provide a seal between the relatively moving components minimizing losses in efficiency as a result of leakage of fluid through the clearance space provided therebetween. The sealing device comprising the present invention is particularly suitable for, but not limited to, apparatuses of the type employing a rotor and stator such as, for example, rotary pumps, steam turbines, gas turbines, or the like. In apparatuses of this general type, it is conventional to provide a design clearance between the stator and the rotor of a magnitude sufficient to avoid interference therebetween in spite of dimensional changes in the rotor and stator as the result of fluctuations in temperature, elongation of the parts as the result of creep, centrifugal forces, etc. Conventionally, the design clearances provided to assure avoidance of interference result in a significant reduction in the efficiency of the apparatus as a result of channeling of the fluid through the clearance space between the rotor and stator.

This problem is particularly pronounced in aircraft jet and gas turbine engines wherein the turbine blades elongate during service as a result of the centrifugal forces imposed thereon in addition to the elevated temperatures to which the components are exposed necessitating the allowance of sufficient clearance to compensate for such blade elongation. Additionally, the turbine blade tips cannot be disposed in precise circumferential alignment resulting in runouts usually of from 1 to several thousandths of an inch which further aggravate the problem of sealing the blade tips relative to the housing.

In order to compensate for the elongation and creep characteristics of the turbine blades which are comprised of high temperature alloys, various sealing devices have heretofore been used or proposed for use such as, for example, ceramic seals which are adapted to be placed in close clearance relationship relative to the blade tips and which are adapted to be progressively abraded away as the turbine blades lengthen during use. Alternatively, wearable or abradable materials such as cermets, fiber metals, and the like, have been employed in lieu of the ceramic materials to maintain close sealing relationship between the blade tips and surrounding housing. In either case, the abrasion of the seal material produces minute particles which impinge on the high speed moving components effecting an erosion thereof and a reduction in their useful operating life. It has also been proposed that suitable honeycomb-type seals be employed which comprise thin foil structures which are adapted to be readily deformed on coming in contact with the blade tips as they progressively elongate during service. Sealing devices of the aforementioned types have not only introduced foreign abrasive matter into the internal structure of such high speed precision apparatus but also necessitate frequent replacement at intervals shorter than the conventional major overhaul periods of such engines.

There has, accordingly, been a long-felt need for a sealing device, particularly in connection with high speed gas turbine engines and the like, which is effective to seal the hot combustion gases passing through the turbine wheels minimizing the channeling of such gases between the turbine blade tips and the surrounding housing so as to avoid a loss of efficiency and power output which is particularly critical during takeoffs and maximum power conditions to which aircraft are subjected. Moreover, there has been a continuing need for such a sealing material which is of substantially improved durability such that service thereof is required at intervals no more frequently than the conventional principal overhaul cycles of such apparatus.

Yet still another object of the present invention is to provide a new process for forming a porous sintered matrix having a controlled porosity and pore size and which is readily adapted for tenaciously bonding the porous matrix to a hard metal backing member.

Yet still a further object of the present invention is to provide a novel method of forming sintered porous metallic matrices of controlled porosities which is simple and economical to control and operate, and which provides the requisite versatility and flexibility for providing articles of the desired size, shape, and dimensional tolerances.

The foregoing and other objects and advantages of the present invention are achieved by forming a substantially uniformly blended powdered mixture of a metallic powder and a volatile organic powder each incorporating particles of a controlled size and configuration and which mixture preferably also includes a volatile binder constituent for providing shape retention of the powdered mixture during the molding or shaping thereof to a preselected configuration. The molded or shaped powdered mass is thereafter sintered at an elevated temperature achieving simultaneous volatilization of the organic binder and volatile organic powder particles and a sintering of the metallic powder particles into a unitary porous matrix having a controlled porosity. It is also contemplated within the scope of the present invention that the powdered mass can be applied directly to the surface of a metallic backing member thereby achieving tenacious bonding of the porous matrix during the sintering operation to the backing member forming therewith a unitary composite sealing device. The resultant porous matrix is preferably impregnated with a solid lubricant and can thereafter be machined, if desired, to the final dimensional tolerances.

Other objects and advantages of the present invention will become apparent from the following detailed description taken in conjunction with the accompanying drawings, wherein:

FIGURE 1 is a fragmentary magnified sectional view of a molded powdered mass comprising a blend of metallic particles and organic volatile particles prior to the sintering operation;

FIGURE 2 is a fragmentary magnified sectional view of an integrally bonded sintered porous matrix derived from the powdered mass as shown in FIGURE 1 and from which the organic particles have been volatilized;

FIGURE 3 is a fragmentary magnified sectional view of the porous matrix as shown in FIGURE 2 further provided with a thin film of a solid lubricant on the inner surfaces of the porous structure thereof;

FIGURE 4 is a fragmentary perspective view partly in section illustrating a composite sealing device incorporating a sintered porous matrix tenaciously bonded to an underlying backing member; and FIGURE 5 is a fragmentary side elevational view partly in section illustrating a typical installation of the compressible seal comprising the present invention relative to the blade tips of a turbine wheel.

The porous metallic matrix as employed in the sealing device comprising the present invention is made in accordance with a special powder metallurgical technique employing metallic powders which vary in composition depending on the specific end use and temperature conditions to which the material is to be subjected in service. For low temperature operating conditions such as in pumps, for example, the metal powder may comprise low carbon steels containing from about 0.1% to about 1% carbon corresponding to SAE designations 1010 to 1090, as well as low alloy steels containing up to about 5% total of suitable alloying agents such as nickel, chromium, manganese, molybdenum, etc. In addition, copper and copper alloy powders can be satisfactorily employed for low temperature service. For intermediate and high temperature service conditions, metallic powders comprised of high alloy steels of the types well known in the art and conventionally containing alloying constituents above 5% stainless steels of the types well known in the art, nickel-chromium base alloys (e.g., Inconel, Nichrome, Hastelloy, etc.) as well as cobalt base alloys (e.g. Stellite), and the like, can be satisfactorily employed. It will be understood that the proportions of the constituents and the compositions thereof as herein set forth are expressed in terms of percentages by weight unless otherwise indicated.

The particle size of the metallic powder which is suitable for forming the porous matrix can range from about 80 mesh (177 microns) down to sub-sieve sizes to about 20 microns and preferably wherein 100% of the particles are below 120 mesh (125 microns) to 25% less than 325 mesh (44 microns) with 0% less than 20 microns. The powder particles preferably are distributed substantially uniformly throughout the size range as opposed to all of them being of one specific size. Additionally, while the particular shape of the metallic powder particles is not critical, they preferably are of a random shaped configuration as opposed to all of the particles being of the same shape, i.e,. for example, all being of a spherical configuration. It should further be pointed out that the mesh sizes as herein employed, are based on U.S. B.S. Sieve Numbers.

The volatile organic powder employed in admixture with the metallic powder particles may comprise any material that will volatilize at elevated temperatures without undergoing a substantial thermal decomposition avoiding the formation of residual ash on the surfaces of the metallic powder particles interfering in their subsequent bonding during the sintering operation. Powders which are suitable for this purpose include a variety of thermoplastic resins such as polyethylene, polypropylene, polyvinyl, polyvinylidene, polyvinyl alcohol, acrylic resins such as, for example, polymethyl methacrylate; and the like, which will volatilize when heated to elevated temperatures up to about 1000° F. and which during evaporation do not materially decompose and do not leave a residuary carbon ash on the surfaces of the powder particles. At the same time, the volatile organic particles are selected so as to volatilize at a temperature above that at which incipient sintering of the metallic particles occur providing an initial sintered strength to the matrix preventing a collapse thereof prior to the completion of the sintering operation. Thermoplastic resins which have been found particularly suitable for this purpose in forming porous sintered matrices employing high temperature alloys of the types hereinbefore set forth include polyethylene resins sold commercially under the trademark Alathon-1655 and acrylic resins sold commercially under the designation Lucite and Plexiglas.

The particle size of the volatile organic powder can range from about 40 mesh (420 microns) to about 140 mesh (105 microns) and preferably from about 60 mesh (250 microns) to about 80 mesh (177 microns). The individual particles comprising the volatile organic powder are preferably of a substantially uniform size within the size ranges as hereinbefore mentioned to provide a resultant sintered matrix having a substantially uniform pore size throughout. A uniformity in the pore size of the material is preferred since substantially uniform density and compressibility characteristics are imparted to the resultant sintered porous matrix. The configuration of the individual volatile organic powder particles is not critical provided that the individual particles are of a substantially equal three-dimensional configuration such as a substantially spherical or cubical configuration as opposed to a pseudo two-dimensional configuration typical of flakes, needles, and the like.

The appropriate metallic powder of the prescribed composition is readily admixed with the appropriate volatile organic powder so as to provide a mixture containing from about 75% to about 40% by volume organic powder and preferably wherein the volatile organic powder comprises about 50% by volume of the mixture. The blending of the metallic powder or mixtures of metallic powders with the organic powder or mixtures of organic powders can be conveniently achieved by any one of the techniques well known in the art so as to provide a substantially uniform mixture.

In order to impart shape-retention characteristics to the powder blend enabling the shaping thereof to a desired configuration prior to sintering, a suitable volatile binder is incorporated with the powder blend preferably during the final stages of blending effecting substantially complete wetting of the surfaces thereof. Binder compositions suitable for this purpose can include solutions of either of the organic resin materials hereinbefore set forth of which the volatile organic powder is comprised which, on subsequent vaporization thereof during the sintering operation, do not thermally decompose or otherwise deposit a residual ash on the surfaces of the metallic powders to be sintered. The binder resins conventionally are dissolved in a suitable volatile organic or aqueous solvent which volatilizes after the shaping of the powder blend or mass to the desired configuration leaving a residuary film of the binder on the particle surfaces retaining the premolded shape thereof. The solvents employed for the vehicle of the binder are preferably selected so as to be substantially incompatible with the volatile organic powder particles in the powdered mass to avoid any appreciable solvation of such particles. The binder resins similarly are possessed of volatility characteristics so as to volatilize after incipient sintering of the metallic powder particles has occurred maintaining shape-retention of the metallic matrix during the sintering operation.

Referring now to FIGURE 1, a fragmentary magnified sectional view is provided of a blended powdered mass comprising the finely particulated metallic powder particles 10 disposed around the peripheral surfaces of the volatile organic particles 12 which are illustrated as being substantially uniformly dispersed throughout the mixture. It will be apparent from FIGURE 1 that the particle size of the volatile organic particles 12 must be controlled within the ranges as hereinbefore set forth since excessive particle sizes produce excessive pore sizes after vaporization of the organic particles which are susceptible to collapsing the sintering operation. On the other hand, organic volatile particles of a size less than about 140 mesh (105 microns) do not provide pores of a sufficient size preventing attainment of the desired compressibility characteristics of the subsequent sintered matrix. It will also be apparent that the greater fineness in size of the metallic powder particles 10 enables compacting and substantially complete filling of the interstices between the volatile organic particles 12, assuring upon subsequent sintering thereof a high strength porous matrix which nevertheless possesses the desired compressibility characteristics.

The blended powdered mass comprising the metallic powder particles 10 and volatile organic particles 12 as shown in FIGURE 1, can be satisfactorily applied directly to an underlying metal substrate or backing member by either applying the powdered mass including the binder composition in the form of a relatively thick paste or alternatively, by forming a suspension or slurry of the powdered mass in an excess volatile solvent enabling spray application of the slurry to the surfaces to be provided with an overlay coating thereon. When spray application of the powdered mass in the form of a suspension is employed, it is necessary to maintain the slurry agitated to assure the maintenance of a substantially uniform suspension providing a substantially uniform spray and deposit of the slurry on the surfaces of the member to be coated. The use of a spray application as opposed to the forming of a paste applied directly to the member to be coated is particularly suitable when coating members of an irregular configuration. After the coating has been applied, the powdered mass is allowed to dry as a result of the volatilization of the binder solvent therefrom leaving the preshaped powdered mass in the appropriate configuration and retained in that shape by the binder contained therein.

In order to achieve a secure bond between the overlying sintered porous matrix and the underlying metallic substrate, it is preferred to subject the substrate to an appropriate surface preparation to provide a chemically clean surface which preferably is also roughened to enhance mechanical bonding therebetween. Chemical cleaning of the surface of the substrate metal can be conveniently achieved by degreasing techniques of the types well known in the art followed thereafter by a grit-blasting employing metal shot which concurrently removes any adherent scale and other foreign deposits from the substrate surface and further provides minute mechanical indentations promoting a mechanical interlock between the substrate and sintered matrix overlay. Metal shot suitable for grit-blasting include chilled cast iron shot or metal shot comprised of typical hard surfacing alloys such as nickel-chromium alloys of which Colmonoy No. 6 (containing Ni, Cr, Si, B, C) comprises a preferred shot material. The metal shot may also comprise brazing alloys wherein minute fragments thereof which adhere to the surface of the metal substrate or become imbedded therein facilitate subsequent bonding of the porous matrix during the sintering operation.

It is also contemplated within the scope of the present invention that the surface of the substrate metal after chemical and mechanical cleaning can be provided with an overlying coating metal such as nickel, chromium, or the like, to increase the oxidation resistance of the substrate metal. Alternatively the surface of the substrate metal can be coated with a relatively thin layer of a suitable brazing alloy of any of the types well known in the art to achieve a stronger bond at the interface of the substrate and porous matrix. The brazing alloy employed for precoating the surface of the metal substrate is selected so as to possess a brazing temperature within the temperature range of the sintering operation. The use of a thin coating of a high temperature brazing alloy of the nickel-base group is particularly satisfactory for uniting a porous matrix to a metal substrate which is to be subjected to elevated temperatures during service.

While it is preferred to sinter the powdered metal mass in situ on the metal substrate, it is also contemplated within the scope of the present invention that the powdered metal mass can be sintered independently and thereafter tenaciously bonded to a metal substrate either by further sintering or brazing. The independent sintering and subsequent bonding of the porous matrix to a metal substrate is generally not preferred in view of the difficulty of obtaining good surface-to-surface contact between the substrate and porous matrix during subsequent sintering bonding. When the preformed sintered porous matrix is bonded to the substrate by employing a suitable brazing alloy, the capillary action of the porous matrix frequently occasions a substantial absorption of the brazing compound within the matrix causing an objectional reduction in its porosity. It is for this reason that although independent sintering and bombing of the porous matrix to a metal substrate can be achieved, it is preferred to achieve concurrent sintering and bonding of the powdered mass to the substrate metal during the sintering operation.

The conditions for sintering the powdered metallic mass are substantially the same irrespective of whether the powdered mass is being sintered independently of or in contact with the metal substrate. The particular conditions will vary depending on the particular composition of the metallic powder particles and the underlying substrate metal, if employed, in order to achieve a high strength porous matrix. Conventionally, sintering temperatures ranging from about 1600° F. up to about 2200° F. are satisfactory for most metallic powders and provide for tenacious bonds between the porous matrix formed and an underlying metal substrate with or without a precoating of an oxidation resistant metal or brazing alloy composition. The atmospheric conditions under which the sintering operation is conducted are controlled so as to be either inert or reducing to the base metal and powder composition employed and preferably, is recirculated so as to carry off the volatile constituents evolved from the powder mass during the sintering operation. Typical sintering atmospheres include vacuum, inert gas atmospheres including argon and helium, for example, hydrogen, as well as any of the types well known in the art. In either event, the sintering operation is continued for a period of time sufficient to effect substantially complete volatilization of the volatile constituents in the powder mass and to tenaciously sinter together the individual metallic powder particles and the resultant matrix to the underlying substrate metal if used.

A fragmentary magnified sectional view of the sintered powdered matrix is illustrated in FIGURE 2 which is characterized as having a plurality of comparatively large pores indicated at 14 which are substantially uniformly distributed throughout a matrix of porous sintered metallic particles 16. The pores 14 represent the voids formed by the vaporization of the volatile organic particles 12 as shown in FIGURE 1 and which pores 14, are of a slightly smaller size due to the inherent shrinkage of the powdered mass during the sintering operation which usually is in the order of about 10% to 15% by volume. The pores 14 and the voids formed between the interstices of the sintered metallic powder particles 16 are interconnected forming a porous matrix having a controlled porosity.

While the resultant sintered matrix is pervious to fluids, the quantity of fluid passing therethrough is negligible with respect to principal leakages occurring in the apparatus in which the sealing device is employed. The resultant matrix is characterized as comprising a porous structural network of walls consisting of sintered metallic particles and which walls define a plurality of substantially uniformly dispersed pores having an average size ranging from about 450 microns to about 100 microns. The pores within the matrix comprise from about 75% to about 30% by volume of the total volume of the matrix.

At the completion of the sintering operation, the porous matrix is preferably impregnated with a solid lubricant forming a thin film on the internal surfaces of the sintered metallic particles. Solid lubricants which are particularly suitable for this purpose include colloidal graphite, colloidal molybdenum disulfide, and fatty acid salts and soaps such as calcium stearates, for example. The use of such a lubricant coating reduces the frictional coaction between the exterior surface of the porous sintered matrix and a member disposed in contact with and moving relative to the surface thereof. Solid lubricants of the foregoing general type have been found to substantially eliminate any tendency of seizing or galling of the surface of the porous matrix as a result of the elongation or dimensional change in the relative clearance therebetween effecting a corresponding compression or deformation of the porous matrix maintaining a tight seal therebetween. The particular type of lubricant employed will vary depending on the temperature conditions, the nature of the fluids, and the frictional characteristics of the metallic powder employed in the metallic matrix and of the member moving relative to the matrix in order to achieve optimum anti-seizing characteristics of the porous matrix seal.

The solid lubricant coating can satisfactorily be impregnated in the porous matrix by forming a liquid suspension in the case of the colloidal graphite and colloidal molybdenum disulfide lubricants in a volatile solvent or alternatively, forming a solution such as in the case of the fatty acid salts and soaps employing a volatile solvent which on vaporization leaves a residuary deposit of the lubricant material on the surfaces of the metallic particles. Relatively low viscosity hydrocarbon liquids as well as halogenated hydrocarbons can be satisfactorily employed for this purpose which have good penetrating qualities for penetrating the interstices between the sintered metallic particles and which thereafter are susceptible to volatilization leaving a residuary deposit of lubricant on the surfaces thereof. A solid lubricant composition comprising a suspension of colloidal graphite in a volatile hydrocarbon liquid which has been found particularly satisfactory for impregnating porous sintered matrices of the type comprising the present invention for use in high temperature operation, comprises a colloidal graphite product commercially designated as KGP "12" and available from King Graphite Products, Inc., of Trenton, Michigan.

FIGURE 3 illustrates a sintered porous matrix which has been impregnated with a solid lubricant forming a thin film indicated at 18 on the surfaces of the metallic sintered particles. The quantity of solid lubricant employed should not be excessive so as to substantially reduce the porosity of the porous matrix. It has been found that films of colloidal graphite of microscopic thickness on the surfaces of the metallic sintered particles comprising the matrix has provided satisfactory anti-seizure characteristics of the porous sintered matrix employed as a seal for the turbine blades of gas turbine engines. Greater quantities can also be employed provided that the lubricant is substantially uniformly distributed and that the porosity is not significantly reduced so as to enable the porous matrix to be compressed when in use to compensate for reductions in the operating clearance between a member moving relatively thereto.

After the porous matrix has been impregnated with the solid lubricant and dried of the volatile carrier liquid, the exterior surfaces thereof can be subjected to a finish machining operation, if desired, to achieve the desired final dimensional accuracy. An exemplary composite sealing device 19, made in accordance with the present invention, is illustrated in FIGURE 4, comprising an arcuate hard metal backing member 20 provided with a porous sintered matrix 22 tenaciously bonded to one surface thereof. A typical installation of the sealing device 19 illustrated in FIGURE 4 is shown in FIGURE 5, wherein the hard metal backing member 20 is securely mounted within a recess 24 in a housing 26 with the porous sintered matrix 22 thereon disposed in close sealing relationship relative to the tip of turbine blade 28. In accordance with this arrangement, as the turbine blade 28 elongates as the result of centrifugal forces, temperature, and creep, the blade tips will come in contact with the peripheral surface of the porous matrix 22, effecting a radial outward (downward as viewed in FIGURE 5) compression or deforming of the porous matrix to compensate for the elongation sustained. The degree of compression of the matrix 22 will be substantially equal to the elongation incurred such that the blade tips and surface of the porous matrix 22 will be in close clearance relationship relative to each other minimizing any channeling of fluid through the clearance space therebetween with a corresponding avoidance of any loss in efficiency. It is also contemplated that the sintered porous matrix can be applied to the peripheral surfaces of the rotor when stress and centrifugal forces are not abnormally high providing satisfactory sealing characteristics.

In accordance with the mode of operation as hereinbefore set forth, it will be apparent that the presence of the relatively large pores 14 as shown in FIGURE 2 of the sintered porous matrix enables a compacting of the matrix in response to the rubbing bearing contact of a member moving adjacent thereto. Since the resultant porous sintered matrix has a density usually of about one-fourth that of the metal of which the powder particles thereof are comprised, the maximum degree of compression possible will be in the order of about 75% of the original thickness of the sintered porous matrix. Since the compressibility of the sintered porous matrix is primarily due to the presence of the large pores 14 distributed substantially uniformly therethrough as opposed to the small voids between the sintered metallic particles 16, the practical degree of compressibility is generally in the range of up to about one-half the original thickness of the porous matrix. Since densification of the porous matrix occurs initially at the surface thereof and progresses inwardly therefrom, practical considerations limit the total thickness and net compressibility to which porous matrices of the type comprising the present invention can be subjected to. However, for most machinery wherein increases in the dimensions of the operating components is of a magnitude ranging from several thousandths up to about fifty thousandths of an inch, adequate sealing devices can be made employing relatively thin coatings of the porous sintered matrix.

In order to further illustrate the sealing device and the method of making the sealing device comprising the present invention, the following example is provided. It will be understood that the example is provided for illustrative purposes and is not intended to be limiting of the scope of the present invention as set forth in the subjoined claims.

*Example I*

A powdered mixture was prepared by blending 7.5 gm. of a volatile organic powder comprising spherical particles of polyethylene (Alathon 1655 from Du Pont Polychemical Division) of a size ranging from 60 to 80 mesh, and 92.5 gm. of Inconel metallic powder (having a nominal composition of 15% chromium, 6% iron, 1% silicon, up to 1% manganese, 0.15% carbon maximum, and the balance nickel), having a particle size ranging from less than 150 mesh to 20 microns. The volatile organic powder particles and metallic particles were blended until a substantially uniform mixture was attained after which a 10% aqueous solution containing polyvinyl alcohol was admixed with the powdered mass forming a relatively thick paste. The resultant paste was applied to the surface of a substrate metal which had previously been degreased and grit-blasted employing metallic shot. The paste was smoothened out in the form of a substantially uniform coating on the surface of the metal substrate and thereafter allowed to drying during which a shrinkage of from about 10% to about 15% in the thickness of the powdered layer occurred. Satisfactory drying was achieved by allowing the coated part to stand overnight at room temperature.

The part was thereafter placed in a sealed retort employing a pure-dry hydrogen atmosphere and sintered at a temperature ranging from 2100° F. to 2200° F. for a period between 30 minutes to one hour. During the sintering operation the polyvinyl alcohol binder and the polyethylene powder particles volatilized forming a residual sintered porous matrix comprised of the Inconel powder particles which were tenaciously bonded to the surface of the metal substrate. At the completion of the sintering operation, the coated part was allowed to cool and thereafter treated with a suspension of colloidal graphite (KGP "12") and thereafter dried depositing an extremely thin residual coating of colloidal graphite on the surfaces of the porous matrix. The resultant part thereafter was subjected to a finish machining operation for attaining the final accurate dimensions and installed for use as a seal in a gas turbine engine.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. The method of forming a compressible porous matrix which comprises the steps of blending a metallic powder and a volatile powder forming a substantially uniform powder mass containing from about 40% to about 75% by volume of said volatile powder, said metallic powder having a size ranging from about 20 microns to about 177 microns, said volatile powder having a size ranging from 105 microns to about 420 microns, heating said powder mass to an elevated temperature for a period of time sufficient to sinter and tenaciously bond the particles of said metallic powder into a porous network and to volatilize said volatile powder forming a porous matrix having a plurality of pores therein corresponding substantially to the spaces formerly occupied by the particles of said volatile powder.

2. The method of forming a compressible porous matrix which comprises the steps of blending a metallic powder and a volatile powder forming a substantially uniform powder mass containing from about 40% to about 75% by volume of said volatile powder, said metallic powder having a size ranging from about 20 microns to about 177 microns, said volatile powder having a size ranging from 105 microns to about 420 microns, heating said powder mass to an elevated temperature for a period of time sufficient to sinter and tenaciously bond the particles of said metallic powder into a porous network and to volatilize said volatile powder forming a porous matrix having a plurality of pores therein corresponding substantially to the spaces formerly occupied by the particles of said volatile powder, and thereafter impregnating said matrix with a solid lubricant forming a thin layer thereof on the surfaces of said metallic powder comprising said network.

3. The method of forming a composite seal device incorporating a compressible porous matrix on at least a portion of the surface thereof which comprises the steps of blending a metallic powder and a volatile powder forming a substantially uniform powder mass containing from about 40% to about 75% by volume of said volatile powder, said metallic powder having a size ranging from about 20 microns to about 177 microns, said volatile powder ranging in size from about 105 microns to about 420 microns, applying said powder mass to at least a portion of the surface of a hard metal backing member, heating said member and said powder mass thereon to an elevated temperature effecting a sintering and tenacious bonding of the particles of said metallic powder into a porous network tenaciously bonded to said member and a volatilization of said volatile powder forming a matrix having a plurality of pores therethrough corresponding substantially to the spaces formerly occupied by the particles of said volatile powder, and thereafter applying a thin coating of a solid lubricant to the surfaces of said metallic particles comprising said network.

4. The method of forming a composite seal having a compressible porous matrix tenaciously bonded to at least a portion of the surface thereof which comprises the steps of blending a metallic powder and a volatile organic powder forming a substantially uniform powder mass containing from about 40% to about 75% by volume of said volatile powder, said metallic powder being of a random-shape and distributed over a size range of from 20 microns to about 120 microns, said volatile powder being of substantially uniform shape and size within a range of from about 177 microns to about 250 microns, providing a hard metal backing member having a chemically clean surface, applying said powder mass to at least a portion of said surface of said member, heating said member and said powder mass thereon to an elevated temperature effecting a sintering and tenacious bonding of the particles of said metallic powder into a porous network tenaciously bonded to said member and a volatilization of said volatile powder forming a matrix having a plurality of pores distributed substantially uniformly therethrough corresponding substantially to the spaces formerly occupied by the particles of said volatile powder, and thereafter applying a thin coating of a solid lubricant on the surfaces of said metallic powder comprising said network.

5. The method as described in claim 4 wherein said surface of said member is shotblasted with metallic shot imparting a plurality of minute indentations therein to facilitate bonding of said matrix to said member.

6. The method as described in claim 4 wherein said surface of said member is precoated with a thin layer of a brazing alloy prior to the application of said powder mass thereto.

References Cited by the Examiner

UNITED STATES PATENTS

| | | | |
|---|---|---|---|
| 2,289,658 | 7/1942 | Koehring | 75—222 |
| 2,310,061 | 2/1943 | Bowen | 75—222 |
| 2,373,405 | 4/1945 | Lowit | 29—420 |
| 2,461,410 | 2/1949 | Clark | 29—191.2 |
| 2,709,651 | 5/1955 | Garnick | 75—222 |
| 2,932,882 | 4/1960 | Kelly | 29—420 |
| 2,979,400 | 4/1961 | Mouwen | 75—222 |
| 3,147,087 | 9/1964 | Eisenlohr | 29—191.2 |

HYLAND BIZOT, *Primary Examiner.*